(12) United States Patent
Matsui et al.

(10) Patent No.: US 9,867,237 B2
(45) Date of Patent: *Jan. 9, 2018

(54) INDUCTION HEATING COOKER

(75) Inventors: Eiji Matsui, Osaka (JP); Akira Kataoka, Shiga (JP); Takaaki Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 236 days.

This patent is subject to a terminal disclaimer.

(21) Appl. No.: 13/257,210

(22) PCT Filed: Mar. 12, 2010

(86) PCT No.: PCT/JP2010/001777
§ 371 (c)(1),
(2), (4) Date: Sep. 16, 2011

(87) PCT Pub. No.: WO2010/106769
PCT Pub. Date: Sep. 23, 2010

(65) Prior Publication Data
US 2012/0006811 A1 Jan. 12, 2012

(30) Foreign Application Priority Data
Mar. 19, 2009 (JP) .................................. 2009-067438

(51) Int. Cl.
*H05B 6/12* (2006.01)
(52) U.S. Cl.
CPC ......... *H05B 6/1263* (2013.01); *H05B 6/1254* (2013.01); *H05B 2206/022* (2013.01); *H05B 2213/07* (2013.01); *Y02B 40/126* (2013.01)

(58) Field of Classification Search
CPC ............................ H05B 6/062; H05B 2213/07
(Continued)

(56) References Cited

U.S. PATENT DOCUMENTS 5,488,214 A * 1/1996 Fettig .................... H05B 6/062
219/127
2008/0142512 A1* 6/2008 Kim ..................... H05B 6/1263
219/757
(Continued)

FOREIGN PATENT DOCUMENTS

CN 102037781 A 4/2011
EP 2 288 231 A1 2/2011
(Continued)

OTHER PUBLICATIONS machine translation of JP-4345504B, Feb. 2016.*
(Continued)

*Primary Examiner* — Tu B Hoang
*Assistant Examiner* — Thomas Ward
(74) *Attorney, Agent, or Firm* — Brinks Gilson & Lione

(57) ABSTRACT

An object of the present invention is to provide an induction heating cooker with improved assemblability, and with which a reduction in the temperature sensing precision of an infrared sensor can be suppressed and a reduction in the thickness of the induction heating cooker can be achieved. To this end, the induction heating cooker of the present invention includes a duct 33 that forms a cooling air path for guiding the cooling air produced by the air blower 32 to a control circuit 27 and to an infrared sensor 26. The infrared sensor 26 and the control circuit 27 are disposed at positions lower than the top wall of the duct 33.

13 Claims, 8 Drawing Sheets

(58) Field of Classification Search
USPC .................................. 219/621, 624, 660, 622
See application file for complete search history.

(56) References Cited

U.S. PATENT DOCUMENTS

| | | | |
|---|---|---|---|
| 2009/0314771 A1* | 12/2009 | Okada | H05B 6/062 219/647 |
| 2011/0073588 A1* | 3/2011 | Kusaka et al. | 219/621 |

FOREIGN PATENT DOCUMENTS

| | | | | |
|---|---|---|---|---|
| JP | 2003-077635 A | 3/2003 | | |
| JP | 2004-087305 A | 3/2004 | | |
| JP | 2004-273303 A | 9/2004 | | |
| JP | 2005-149829 A | 6/2005 | | |
| JP | 4345504 B * | 8/2005 | ............. | H05B 6/12 |
| JP | 2006-294284 A | 10/2006 | | |
| JP | 2008-229152 A | 10/2008 | | |
| JP | 2009-252633 A | 10/2009 | | |
| JP | 2009-289424 A | 12/2009 | | |
| WO | WO 2009/001537 A1 | 12/2008 | | |

OTHER PUBLICATIONS

Supplementary European Search Report in corresponding European Application No. 10 75 3266, dated Dec. 16, 2013, 9 pages.
Translation of the International Preliminary Report on Patentability for International Application No. PCT/JP2010/001777, dated Nov. 8, 2011, 7 pages.
International Search Report for International Application No. PCT/JP2010/001777, dated Jun. 15, 2010, 3 pages.

* cited by examiner

INDUCTION HEATING COOKER

This application is a 371 application of PCT/JP2010/001777 having an international filing date of Mar. 12, 2010, which claims priority to JP 2009-067438 filed on Mar. 19, 2009, the entire contents of which are incorporated herein by reference.

TECHNICAL FIELD

The present invention relates to an induction heating cooker including an infrared sensor.

BACKGROUND ART

Conventionally, an induction heating cooker of this type is configured to directly sense infrared radiation radiated from a cooking vessel placed on a top plate, and it is known for its excellent thermal responsiveness. For example, PATENT DOCUMENT 1 (Japanese Unexamined Patent Publication No. 2004-273303) discloses an induction heating cooker of this type.

PATENT DOCUMENT 1 discloses an induction heating cooker including: a magnetic field shielding member that suppresses magnetic flux leakage from a heating coil disposed below a top plate; an infrared sensor that senses infrared radiation radiated from a cooking vessel placed on the top plate; and a control circuit that controls an output of the heating coil based on a sensing signal from the infrared sensor. In the induction heating cooker disclosed in PATENT DOCUMENT 1, in order to suppress the infrared sensor from generating heat due to a magnetic field generated by the heating coil, the infrared sensor is disposed at a position lower than the magnetic field shielding member.

Further, FIG. 8 shows the structure of another conventional induction heating cooker other than that disclosed in PATENT DOCUMENT 1. As shown in FIG. 8, the conventional induction heating cooker has a box-like shape whose top portion is open, and includes a body 1 which structures an outer casing of the cooker. At the top portion of the body 1, a flat top plate 3 on which a cooking vessel 2 is placed is provided so as to cover the top opening of the body 1.

In the body 1 and below the top plate 3, a heating coil 4 that inductively heats the cooking vessel 2 is placed. Below the heating coil 4, a plurality of ferrite elements 5 possessing magnetic field attraction are radially placed. The ferrite elements 5 suppress the magnetic field generated by the heating coil 4 from proceeding further below the ferrite elements 5.

At a position below the top plate 3 and facing to the cooking vessel 2, an infrared sensor 6 is placed. The infrared sensor 6 senses infrared radiation having radiated from the bottom surface of the cooking vessel 2 and passed through the top plate 3. Below the infrared sensor 6, a control circuit 7 that controls the output of the heating coil 4 based on the output signal from the infrared sensor 6 is placed.

The control circuit 7 is disposed in a cooling air path 11 formed between a partition plate 10 placed below the heating coil 4 and the bottom portion of the body 1. In the control circuit 7, a heat generating component 8 such as an insulated gate bipolar transistor (hereinafter referred to as an IGBT) joined to a heatsink or a resonance capacitor is installed. Further, inside the body 1, an air blower 9 that sends cooling air to the cooling air path 11 is provided. By the air blower 9 sending the cooling air, the heat generating component 8 is cooled to a desired temperature.

The heating coil 4 is attached to the top surface of a coil base 13 that stores therein the ferrite elements 5 by an adhesive or the like. The coil base 13 is supported by springs 12 placed on the partition plate 10, so as to be pressed against the bottom surface of the top plate 4 having the spacer 16 interposed therebetween. The spacer 16 is disposed between the coil base 13 and the top plate 4 for forming space between the heating coil 4 and the top plate 3.

The infrared sensor 6 is disposed below the ferrite elements 5 and above the partition plate 10. The infrared sensor 6 is disposed in a magnetic field shielding case 14 formed with aluminum or the like that exhibits the magnetic field shielding effect. Thus, the infrared sensor 6 is less affected by the magnetic field generated from the heating coil 4, thanks to the magnetic field shielding effect of the ferrite elements 5 and the magnetic field shielding case 14.

Further, the magnetic field shielding case 14 is affected by heat generated from the heating coil 4 or the cooking vessel 2 while cooking is carried out. Thus, the temperature inside the magnetic field shielding case 14, that is, the ambient temperature around the infrared sensor 6 rises. When the ambient temperature of the infrared sensor 6 becomes high, the output signal of the infrared sensor 6 varies as being affected by the ambient temperature, and the temperature sensing precision of the infrared sensor 6 is impaired. Therefore, the partition plate 10 is provided with an airflow vent 15 near the infrared sensor 6. Through the airflow vent 15, part of the cooling air from the air blower 9 blows in the magnetic field shielding case 14, whereby the magnetic field shielding case 14 is cooled, and the ambient temperature of the infrared sensor 6 drops. Thus, a reduction in the temperature sensing precision of the infrared sensor 6 is suppressed.

PATENT DOCUMENT 1: Japanese Unexamined Patent Publication No. 2004-273303

SUMMARY OF THE INVENTION

Subjects to be Solved by the Invention

In recent years, there is an increasing demand for a reduction in the thickness of the induction heating cooker. In order to reduce the thickness of the induction heating cooker, it is effective to reduce the interval between each of the components. However, in this case, since the space inside the induction heating cooker becomes small, the ambient temperature in the space tends to rise. Accordingly, in some cases, the above-described conventional structure in which part of the cooling air flowing in the cooling air path 11 is branched toward the outside of the cooling air path 11 by the airflow vent 15 so as to blow in the magnetic field shielding case 14 may not fully exhibit the cooling effect of the infrared sensor 6. In such cases, the temperature sensing precision of the infrared sensor 6 may be impaired.

Further, with the conventional structure, the infrared sensor 6 is surrounded by the magnetic field shielding case 14, and the partition plate 10 is interposed between the magnetic field shielding case 14 and the control circuit 7. Therefore, it poses an issue in terms of assemblability, e.g., complicated layout of the wiring connecting between the infrared sensor 6 and the control circuit 7.

Still further, even when the infrared sensor is disposed below the magnetic field shielding member as disclosed in PATENT DOCUMENT 1, in a case where the distance between the infrared sensor and any heat generating component such as the heating coil is small, it is difficult to fully suppress an increase in the ambient temperature of the infrared sensor.

An object of the present invention is to improve the conventional issues stated above, and to provide an induction heating cooker with improved assemblability, and with which a reduction in the temperature sensing precision of the infrared sensor can be suppressed and a reduction in the thickness of the induction heating cooker can be achieved.

Means for Solving the Subjects

In order to achieve the foregoing object, the present invention is provided with the following arrangements.

According to a first aspect of the present invention, there is provided an induction heating cooker, comprising:

a body that structures an outer casing;

a top plate that covers a top portion of the body;

a heating coil that is placed below the top plate, the heating coil heating a cooking vessel placed on the top plate;

an infrared sensor that is placed lower than the heating coil, the infrared sensor sensing infrared radiation radiated from the cooking vessel;

a control circuit that is placed lower than the heating coil, the control circuit controlling an output of a high frequency current that energizes the heating coil based on an output of the infrared sensor;

an air blower that is placed lower than the heating coil, the air blower producing a cooling air; and a duct that forms a cooling air path guiding the cooling air to the control circuit and to the infrared sensor, wherein the infrared sensor and the control circuit are placed lower than a top wall of the duct.

According to a second aspect of the present invention, there is provided the induction heating cooker as defined in the first aspect, wherein the control circuit and the infrared sensor are disposed on a windward side in connection with the cooling air than a circumferential wall of the body.

According to a third aspect of the present invention, there is provided the induction heating cooker as defined in the first or second aspect, wherein the control circuit and the infrared sensor are disposed inside the duct.

According to a fourth aspect of the present invention, there is provided the induction heating cooker as defined in any one of the first to third aspects, further comprising below the heating coil, a heat dissipating plate that dissipates heat transferred from the heating coil or the cooking vessel, wherein the infrared sensor, the control circuit, and the air blower are disposed lower than the heat dissipating plate.

According to a fifth aspect of the present invention, there is provided the induction heating cooker as defined in the fourth aspect, wherein the heat dissipating plate is brought into contact with the cooling air on a leeward side in connection with the cooling air than the control circuit and the infrared sensor, and cooled thereby.

According to a sixth aspect of the present invention, there is provided the induction heating cooker as defined in the fourth or fifth aspect, wherein the heat dissipating plate has a magnetic field shielding effect of preventing a magnetic field generated by the heating coil from leaking below the heat dissipating plate.

According to a seventh aspect of the present invention, there is provided the induction heating cooker as defined in any one of the first to sixth aspects, further comprising a guide that is attached inside the duct, the guide branching the cooling air into a first cooling air directed toward the infrared sensor and a second cooling air directed toward the control circuit.

According to an eighth aspect of the present invention, there is provided the induction heating cooker as defined in any one of the first to seventh aspects, wherein the infrared sensor is attached to the control circuit.

According to a ninth aspect of the present invention, there is provided the induction heating cooker as defined in any one of the first to seventh aspects, wherein the infrared sensor is disposed inside a casing, and the casing has top surface attached to a bottom surface of the top wall of the duct.

According to a 10th aspect of the present invention, there is provided the induction heating cooker as defined in any one of the fourth to sixth aspects, wherein the infrared sensor is disposed inside a casing, and the casing penetrates through the heat dissipating plate and is attached to a coil base supporting the heating coil.

According to an 11th aspect of the present invention, there is provided the induction heating cooker as defined in the ninth or 10th aspect, further comprising a cylindrical element that penetrates through a top portion of the casing so as to extend from a proximity of the infrared sensor to a proximity of a back surface of the top plate.

According to a 12th aspect of the present invention, there is provided the induction heating cooker as defined in any one of the first to 11th aspects, wherein the control circuit includes a switching element for producing the high frequency current, and the infrared sensor and the switching element are disposed substantially in parallel to each other in a flow direction of the cooling air.

According to a 13th aspect of the present invention, there is provided the induction heating cooker as defined in any one of the first to 12th aspects, wherein a light-absorbing process is placed to a surface of the duct facing the top plate.

Effects of the Invention

With the induction heating cooker of the present invention, provision of the duct that forms a cooling air path guiding the cooling air to the control circuit and the infrared sensor allows the cooling air of a greater air volume to blow in the infrared sensor to thereby efficiently cool the infrared sensor. Accordingly, even when a distance between the infrared sensor and the heating coil is reduced in accordance with a reduction in the thickness of the induction heating cooker, the infrared sensor can more surely be cooled, and a reduction in the temperature sensing precision of the infrared sensor can be suppressed.

Further, with the induction heating cooker of the present invention, since both the infrared sensor and the control circuit are placed at positions lower than the top wall of the duct, intervening objects between the infrared sensor and the control circuit can be reduced. Accordingly, an improvement in assemblability, e.g., simplified layout of the wiring electrically connecting between the infrared sensor and the control circuit, can be achieved.

BRIEF DESCRIPTION OF THE DRAWINGS

These and other aspects and features of the present invention will become clear from the following description taken in connection with the preferred embodiments thereof with reference to the accompanying drawings, in which.

DETAILED DESCRIPTION OF THE PREFERRED EMBODIMENTS

Figure 1:
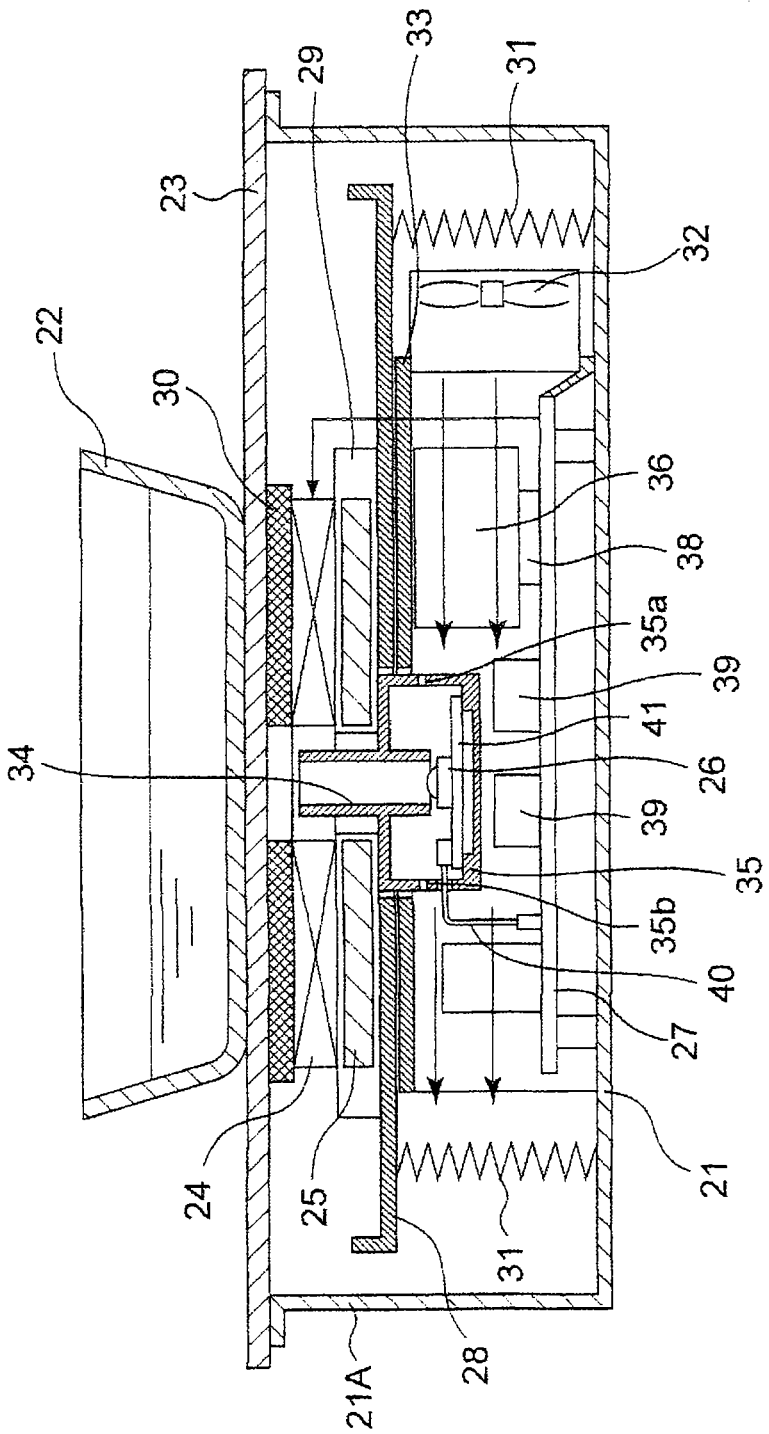
FIG. 1 is a cross-sectional view schematically showing the structure of an induction heating cooker according to a first embodiment of the present invention.

Before the description of the present invention proceeds, it is noted that like parts are designated by like reference numerals throughout the accompanying drawings.

In the following, embodiments of the present invention will be described with reference to the drawings. It is noted that the present invention is not limited by the embodiments.

First Embodiment

FIG. 1 is a cross-sectional view schematically showing the structure of an induction heating cooker according to a first embodiment of the present invention.

As shown in FIG. 1, the induction heating cooker according to the first embodiment has a box-like shape whose top portion is open, and includes a body 21 which structures an outer casing of the cooker. At the top portion of the body 21, a flat top plate 23 on which a cooking vessel 22 is placed is provided so as to cover the top portion opening of the body 21.

In the body 21 and below the top plate 23, a ring-like heating coil 24 that inductively heats the cooking vessel 22 is provided. Between the heating coil 24 and the top plate 23, in order to reduce the effect of the heat generated by the heated cooking vessel 22 on the heating coil 24, a heat insulating material 30 made of ceramic fibers or the like is provided.

Below the heating coil 24, ferrite elements 25 being one example of a plurality of magnetic field shielding members possessing magnetic field attraction are radially provided. The ferrite elements 25 suppress the magnetic field generated by the heating coil 24 from proceeding further below the ferrite elements 25. The ferrite elements 25 are stored in a substantially ring-like coil base 29. The heating coil 24 is attached to the top surface of the coil base 29 by an adhesive or the like.

Below the ferrite elements 25, a heat dissipating plate 28 possessing heat conductivity is disposed. The heat dissipating plate 28 supports the heating coil 24 from below via the coil base 29. Further, the heat dissipating plate 28 is biased upward by springs 31 placed at the bottom portion of the body 21, so as to press the heating coil 24 against the bottom surface of the top plate 23 via a heat insulating material 30. Further, the heat dissipating plate 28 is structured to expose at least of part of its surface to the space inside the body 21, so as to be capable of dissipating heat transferred from the heating coil 24 or the cooking vessel 22 toward the space inside the body 21. Further, the heat dissipating plate 28 is structured to partition the space on the side of the heating coil 24, and the space on the side of a duct 33, an infrared sensor 26, and a control circuit 27, whose description will be given later.

It is noted that, the heat dissipating plate 28 is preferably structured with a member possessing the heat conductivity and the magnetic field shielding effect, such as aluminum. Thus, it becomes possible to more surely suppress the magnetic field generated by the heating coil 24 from leaking below the heat dissipating plate 28, and to achieve a further reduction in the thickness of the induction heating cooker. Further, it becomes possible to more surely suppress the magnetic field generated by the heating coil 24 from leaking toward the infrared sensor 26 positioned below the heat dissipating plate 28, and the temperature sensing precision of the infrared sensor 26 can be improved.

At the position below the top plate 23 and facing the cooking vessel 22, the infrared sensor 26 is provided. The infrared sensor 26 senses the infrared radiation having radiated from the bottom surface of the cooking vessel 22 and passed through the top plate 103, and outputs a signal corresponding to the light amount of the sensed infrared radiation.

The infrared sensor 26 is disposed in a substantially box-like casing 35. More specifically, the infrared sensor 26 is mounted on the circuit board 41 held in the casing 35. The circuit board 41 is structured with a member possessing the heat conductivity. The casing 35 penetrates through the heat dissipating plate 28, and is fixed to the bottom surface of the coil base 29. The infrared sensor 26 is disposed at a position lower than the ferrite elements 25. Therefore, by the magnetic field shielding effect of the ferrite elements 25, the effect of the magnetic field generated by the heating coil 104 is reduced.

A cylindrical element 34 penetrates through the top portion of the casing 35, extending from the proximity of the infrared sensor 26 to the proximity of the back surface of the top plate 23. The cylindrical element 34 functions as a light guiding unit guiding the infrared radiation having radiated from the bottom surface of the cooking vessel 22 and passed through the top plate 23 to the infrared sensor 26. The cylindrical element 34 is integrally structured with the casing 35 using aluminum, resin, or the like.

Placed below the casing 35 is the control circuit 27 that controls the output of the heating coil 24 based on the output of the infrared sensor 26, that is, the output signal corresponding to the light amount of the infrared radiation sensed by the infrared sensor 26. The circuit board 41 on which the infrared sensor 26 is mounted and the control circuit 27 are electrically connected to each other by a wiring 40 disposed to penetrate through the casing 35. The control circuit 27 is fixed to the bottom portion of the body 21.

To the control circuit 27, heat generating components for generating a high frequency current such as a switching element 38 (e.g., an IGBT), resonance capacitors 39, and the like are installed. Since the switching element 38 is a member that easily generates heat, it is attached to a heatsink 36 provided to the control circuit 27 in order to improve the cooling efficiency. Between the heat dissipating plate 28 and the bottom portion of the body 21, on the side of the control circuit 27, an air blower 32 that generates cooling air (see the arrow in FIG. 1) is disposed. The control circuit 27 and the infrared sensor 26 are disposed on the windward side in connection with the cooling air from the air blower 32 than the circumferential wall (sidewall) 21A of the body 21.

Between the heat dissipating plate 28 and the bottom portion of the body 21, the duct 33 that guides the cooling air from the air blower 32 to the control circuit 27 and to the infrared sensor 26 is disposed. Inside the duct 33, at least part of the casing 35 that surrounds the air blower 32 and the infrared sensor 26 is disposed. The duct 33 guides the cooling air from the air blower 32 toward the control circuit 27 and toward the infrared sensor 26. In other words, the duct 33 forms a cooling air path for the control circuit and the infrared sensor. The cooling air path that the duct 33 forms is large enough to contain therein both the control circuit 27 and the infrared sensor 26. Accordingly, by the cooling air from the air blower 32 being blown into the cooling air path, the control circuit 27 is cooled to a desired temperature, and the infrared sensor 26 is cooled to the desired temperature via the casing 35.

It is noted that, the duct 33 is only required to form a tubular cooling air path through which the cooling air from the air blower 32 flows. For example, the duct 33 itself may be formed to be tubular, so as to form a cooling air path therein. Further, the duct 33 may be formed to have a U-shaped cross section, having the both ends in the cross sectional direction attached to the circuit board of the control circuit 27 or to the bottom portion of the body 21, to thereby form a cooling air path. That is, part of the circuit board of the control circuit 27 or part of the bottom portion of the body 21 may be used as the bottom wall of the duct 33.

It is noted that, part of the heat dissipating plate 28 may be used as the top wall of the duct 33. It is noted that, in this case, the cooling air path is formed with part of the heat dissipating plate 28. Therefore, in a case where the temperature of the heat dissipating plate 28 rises by heat transferred from the heating coil 24 or the like, the cooling air is warmed by the heat dissipating plate 28. Thus, the cooling efficiency of the infrared sensor 26 and the control circuit 27 may be impaired. Accordingly, the heat dissipating plate 28 should preferably be structured to be brought into contact with the cooling air on the leeward side in connection with the cooling air than the infrared sensor 26 and the control circuit 27. By the heat dissipating plate 28 being brought into contact with the cooling air, the heat dissipation effect of the heat dissipating plate 28 can be improved.

It is noted that, the circumferential wall 21A of the body 21 is prone to be affected by the ambient temperature of the induction heating cooker (room temperature), or by the temperature inside the cabinet where heat is more prone to accumulate in a case where it is installed in a kitchen cabinet. Therefore, it is not preferable to use the circumferential wall 21A of the body 21 as part of the duct 33.

According to the first embodiment, since both the infrared sensor 26 and the control circuit 27 are disposed at positions lower than the heat dissipating plate 28 and the top wall of the duct 33, it becomes possible to reduce any intervening objects between the infrared sensor 26 and the control circuit 27. Accordingly, it becomes possible to achieve an improvement in assemblability, e.g., simplified layout of the wiring 40 that electrically connects between the infrared sensor 26 and the control circuit 27.

Further, according to the first embodiment, since the duct 33 forming the cooling air path that guides the cooling air from the air blower 32 to the control circuit 27 and the infrared sensor 26 is provided, the cooling air of a greater air volume can be blown in the infrared sensor 36, to thereby efficiently cool the infrared sensor 26. Accordingly, even when the distance between the infrared sensor 26 and the heating coil 24 becomes short in accordance with a reduction in the thickness of the induction heating cooker, the infrared sensor 26 can more surely be cooled and a reduction in the temperature sensing precision of the infrared sensor 26 can be suppressed.

Still further, according to the first embodiment, since at least part of the casing 35 that covers and protects the infrared sensor 26 is disposed in the duct 33, so as to cool the casing 35 by the cooling air from the air blower 32, the ambient temperature around the infrared sensor 26 can be reduced. Thus, it becomes possible to cool the infrared sensor 26 to thereby suppress a reduction in the temperature sensing precision in the infrared sensor 26.

Still further, according to the first embodiment, since the control circuit 27 and the infrared sensor 26 are disposed on the windward side in connection with the cooling air from the air blower 32 than the circumferential wall 21A of the body 21, the control circuit 27 and the infrared sensor 26 can efficiently be cooled without being affected by the ambient temperature of the induction heating cooker (room temperature) or the temperature inside the kitchen cabinet.

Still further, according to the first embodiment, provision of the cylindrical element 34 extending from the proximity of the infrared sensor 26 to the proximity of the back surface of the top plate 23 makes it possible to drastically cut off the light entering the proximity of the infrared sensor 26 from the outside of the cylindrical element 34. Accordingly, it becomes possible to suppress unstableness of the output of the infrared sensor 26 due to the effect of ambient light.

Still further, according to the first embodiment, disposition of the infrared sensor 26 inside the duct 33 allows the duct 33 to cut off the ambient light. Accordingly, the output of the infrared sensor 26 can further be stabilized.

Still further, according to the first embodiment, since one end of the cylindrical element 34 is positioned at the proximity of the infrared sensor 26, it becomes possible to suppress any effect on the output of the infrared sensor 26 caused by the cooling air from the air blower 32. Accordingly, flexibility in disposing the infrared sensor 26 in the vertical direction can be improved; for example, the infrared sensor 26 can be disposed at a position where the velocity of the cooling air of the air blower 32 is high. Thus, optimization of the cooling performance can easily be achieved.

Still further, according to the first embodiment, since the heating coil 24 is supported by the springs 31 via the heat dissipating plate 28 and the coil base 29, it is somewhat flexible. That is, the heating coil 24 may displace in the horizontal direction. In contrast thereto, the casing 35 holding the infrared sensor 26 is fixed to the bottom surface of the coil base 29 holding the heating coil 24. Therefore, even when the heating coil 24 displaces in the horizontal direction, the positional relationship between the infrared sensor 26 and the heating coil 24 is maintained. Accordingly, the infrared sensor 26 can more surely sense the infrared radiation radiated from the cooking vessel 22.

Still further, the present invention is not limited to the embodiment described above, and can be practiced in various modes. For example, in the first embodiment, the cylindrical element 34 has an integrated structure in which the sections corresponding to the heat dissipating plate 28 and the duct 33 are continuous one above the other; i.e., the cylindrical element 34 is structured with one component. However, the present invention is not limited thereto. The cylindrical element 34 is only required to form a continuous hole (through hole) vertically to the heat dissipating plate 28. For example, the cylindrical element 34 may be dividable into a top component and a bottom component with reference to the heat dissipating plate 28. That is, the cylindrical element 34 may be structured with components equal to or more than two in number.

Still further, according to the first embodiment, though the heat dissipating plate 28 is provided, the present invention is not limited thereto. The heat dissipating plate 28 may not be provided.

Still further, according to the first embodiment, though the infrared sensor 26 and the control circuit 27 are placed in the duct 33, the present invention is not limited thereto. For example, the infrared sensor 26 and the control circuit 27 may be placed in the proximity of the end of the duct 33 disposed on the cooling air discharge side (see FIG. 4 whose description will be given later). In this case also, the effect as described above can be achieved.

Still further, the casing 35 may be provided with an airflow vent 35a that takes in the cooling air from the air blower 32 into the inner space. This allows the cooling air from the air blower 32 to flow into the casing 35, whereby the cooling efficiency of the infrared sensor 26 can further be improved. Further, the casing 35 may be provided with an airflow vent 35b that discharges the cooling air from the air blower 32 taken into the inner space to the outside.

Still further, a light-absorbing process such as black coating may be applied to the surface of the duct 33 facing the top plate 23. This allows the ambient light entering from the top plate 23 to be absorbed by the duct 33. Therefore, the effect of the ambient light on the infrared sensor 26 positioned lower than the duct 33 can be reduced. Accordingly, the temperature sensing precision of the infrared sensor 26 can be improved.

Second Embodiment

Figure 2:
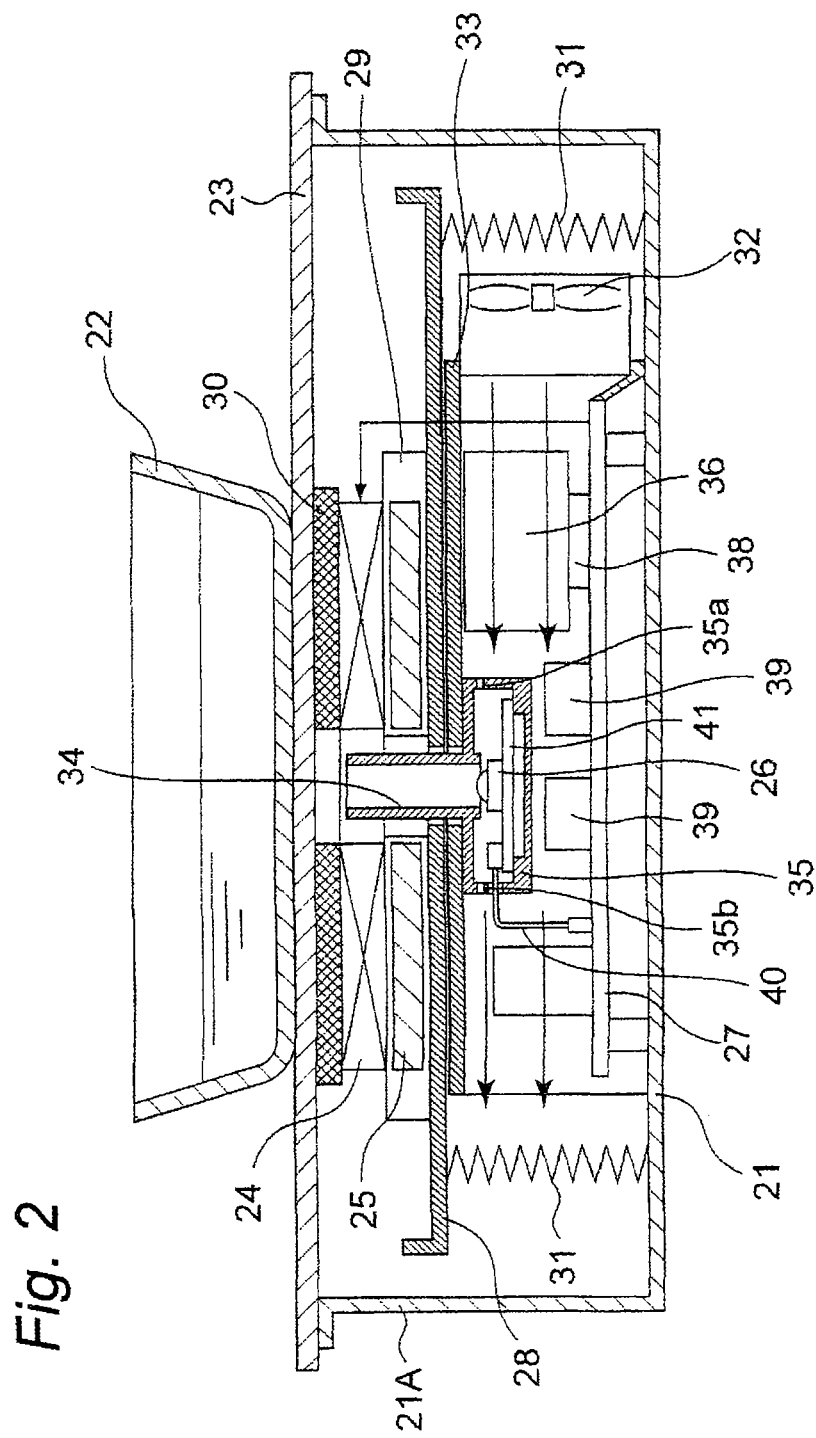
FIG. 2 is a cross-sectional view schematically showing the structure of an induction heating cooker according to a second embodiment of the present invention.

FIG. 2 is a cross-sectional view showing the structure of an induction heating cooker according to a second embodiment of the present invention. The induction heating cooker according to the second embodiment is different from the induction heating cooker according to the first embodiment in that the top surface of the casing 35 is attached to the bottom surface of the top wall of the duct 33, and the casing 35 and the duct 33 are integrally structured.

According to the second embodiment, since the casing 35 and the duct 33 are integrally structured, the layout of the wiring 40 can be set before the control circuit 27 is covered by the duct 33. Accordingly, the layout of the wiring 40 electrically connecting between the infrared sensor 26 and the control circuit 27 can further be simplified, and the assemblability can be improved.

Further, according to the second embodiment, the size of the hole provided to the heat dissipating plate 28 and the duct 33 so as to allow the casing 35 to open can be reduced to about the outer diameter of the cylindrical element 34. Thus, the cooling air from the air blower 32 can be prevented from leaking through the hole toward the top plate 23 (loss of the cooling air), and the cooling performance can be improved.

It is noted that, according to the second embodiment, though the duct 33 and the casing 35 are structured with separate components, the present invention is not limited thereto. The duct 33 and the casing 35 may be structured with one component. Thus, a reduction in costs can be achieved by a reduction in both the space and the number of assembly steps.

Further, according to the second embodiment, though the casing 35 and the duct 33 are integrally structured, the top surface of the casing 35 may be fixed to the bottom surface of the heat dissipating plate 28, such that the casing 35 and the heat dissipating plate 28 are integrally structured. In this case also, the effect similar to that described above can be achieved.

Third Embodiment

Figure 3:
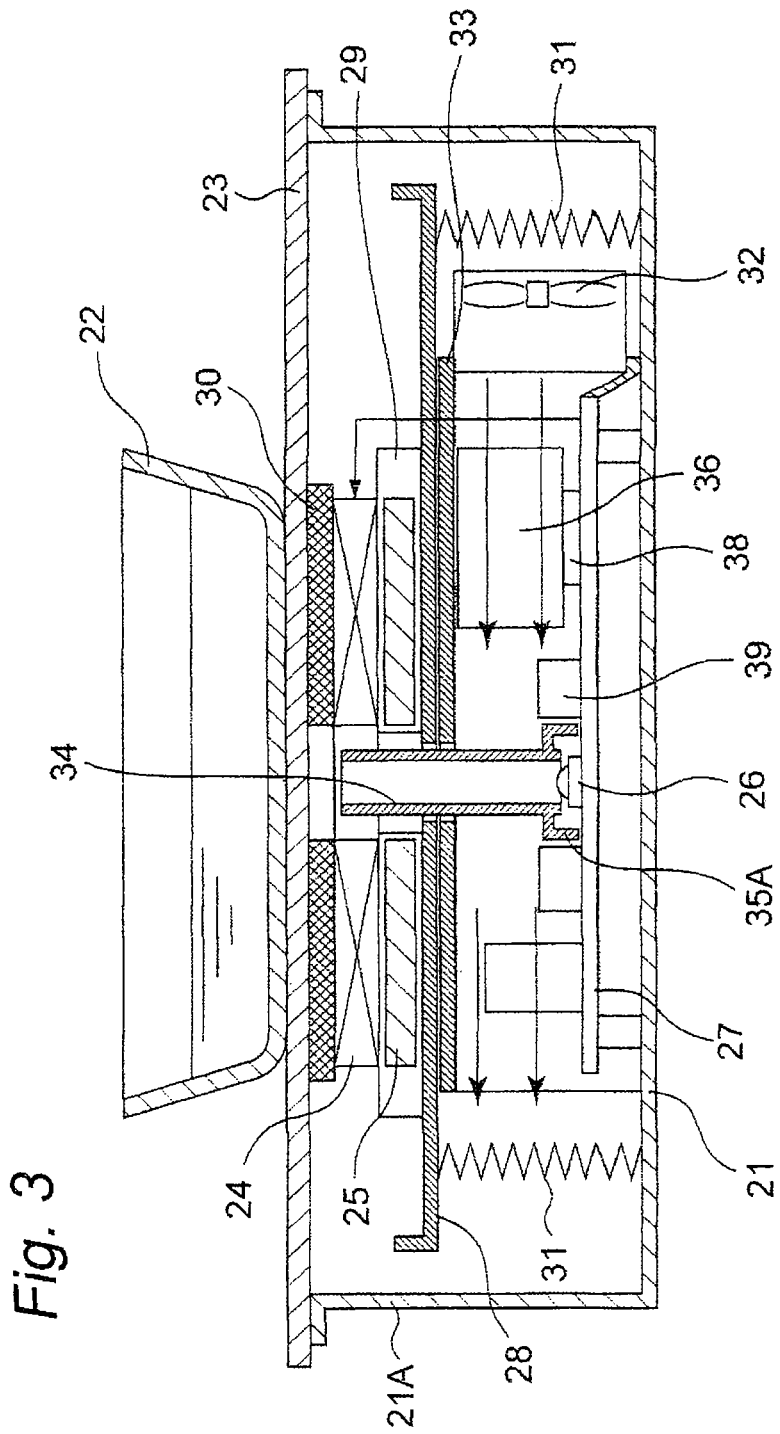
FIG. 3 is a cross-sectional view schematically showing the structure of an induction heating cooker of a third embodiment of the present invention.

FIG. 3 is a cross-sectional view showing the structure of an induction heating cooker according to a third embodiment of the present invention. The induction heating cooker according to the third embodiment is different from the induction heating cooker according to the first embodiment in that the infrared sensor 26 and the control circuit 27 are mounted on the same circuit board, and a casing 35A is attached to the control circuit 27 so as to cover the infrared sensor 26.

According to the third embodiment, since the infrared sensor 26 is mounted on the circuit board identical to that on which the control circuit 27 is mounted, the electrical connection between the infrared sensor 26 and the control circuit 27 can be established by a pattern on the circuit board without dispensing with the wiring 40. Accordingly, the assemblability can further be improved.

It is noted that, in this case, by allowing the cooling air from the air blower 32 to blow in the wiring pattern on the back surface side of the circuit board of the control circuit 27 also, the electronic components on the control circuit 27 which achieve high temperatures are cooled from the wiring pattern side also. Thus, the cooling effect can further be improved.

Fourth Embodiment

Figure 4:
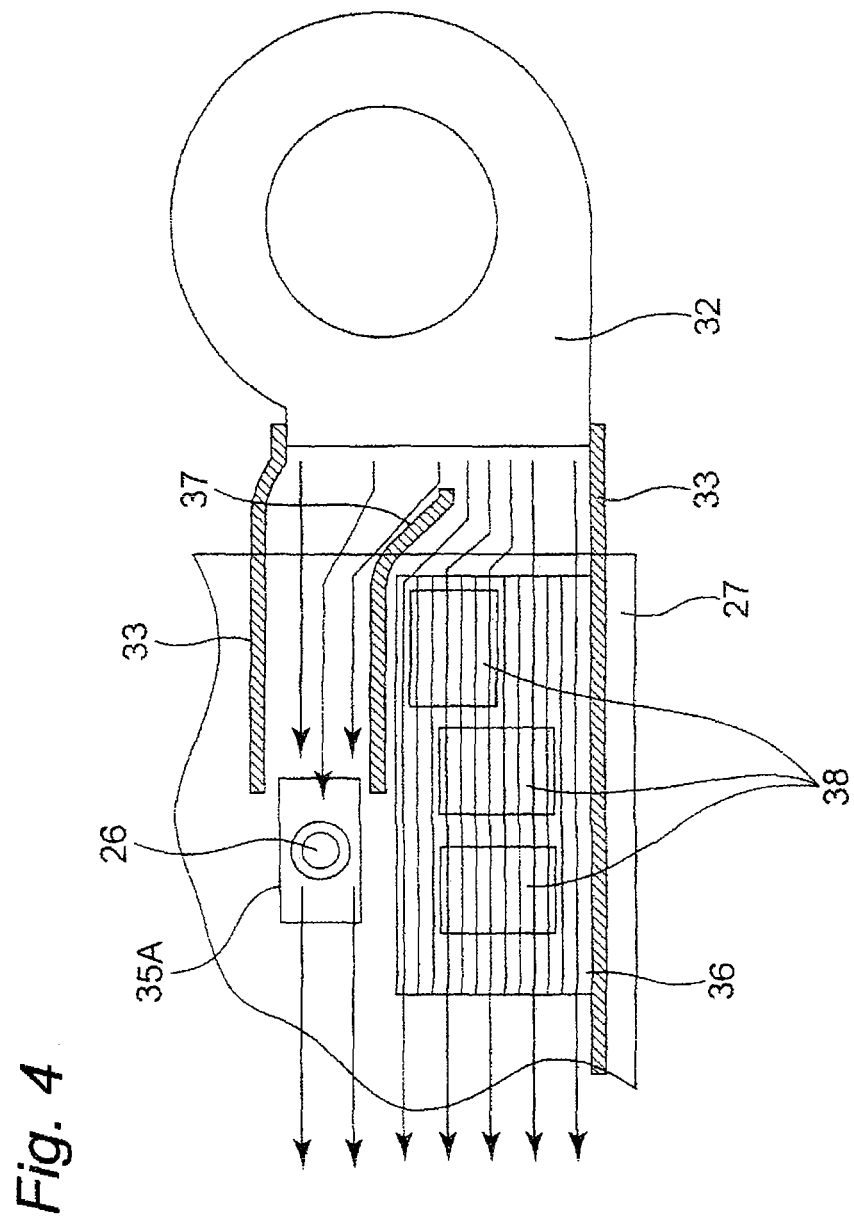
FIG. 4 is a plan view showing the inside of a duct of an induction heating cooker according to a fourth embodiment of the present invention as seen from above.

FIG. 4 is a plan view of the inside of a duct of an induction heating cooker according to a fourth embodiment of the present invention as seen from above. The induction heating cooker according to the fourth embodiment is different from the induction heating cooker according to the third embodiment in that a guide 37 is placed in the duct 33 such that the cooling air from the air blower 32 is branched into the first cooling air directed toward the infrared sensor 26 and the second cooling air directed toward the heat generating components such as the switching elements 38 on the control circuit 27. Further, according to the fourth embodiment, the infrared sensor 26 and the switching elements 38 on the control circuit 27 are disposed substantially in parallel to each other relative to the flow direction of the cooling air from the air blower 32, and the infrared sensor 26 and the switching element 38 are disposed in the proximity of the end of the duct 33 on the cooling air discharge side.

According to the fourth embodiment, the guide 37 is placed in the duct 33 such that the cooling air from the air blower 32 is branched into the first cooling air directed toward the infrared sensor 26 and the second cooling air directed toward the switching elements 38. That is, it is configured such that the guide 37 forms the cooling air path for the infrared sensor 26 and the cooling air path for the switching elements 38. Thus, the cooling air of a greater air volume can be blown in the infrared sensor 26, whereby the performance of cooling the infrared sensor 26 can further be improved. It is noted that, when it is configured such that the velocity of the cooling air directed toward the infrared sensor 26 becomes faster than the velocity of the cooling air directed toward the switching elements, the performance of cooling the infrared sensor 26 can further be improved.

Further, according to the fourth embodiment, the infrared sensor 26 and the switching elements 38 for producing a high frequency current at the control circuit 27 are disposed substantially in parallel to each other relative to the flow direction of the cooling air from the air blower 32. Thus, the effect of the heat generated by the switching elements 38 on the infrared sensor 26 can be reduced, and as a result, the performance of cooling the infrared sensor 26 can be improved.

Further, according to the fourth embodiment, though the guide 37 forms the cooling air path for the infrared sensor 26 and the cooling air path for the switching elements 38, the present invention is not limited thereto. It is only required that the cooling air paths respectively directed to the infrared sensor 26 and the control circuit 27 are formed. Further, it is also possible to provide a guide in the duct 33 such that the cooling air from the air blower 32 is branched into the first cooling air directed toward the infrared sensor 26, the second cooling air directed toward the control circuit 27, and the third cooling air directed to the heat dissipating plate 28. That is, it is also possible allow the guide to form the cooling air path for the infrared sensor 26, the cooling air path for the switching element 38, and the cooling air path directed toward the heat dissipating plate 28. Thus, it becomes possible to cool the heat dissipating plate 28 with the cooling air of a greater air volume, and to reduce the heat quantity transferred from the heat dissipating plate 28 to the casing 35. Thus, the temperature sensing precision of the infrared sensor 26 can be improved.

EXAMPLE

Figure 5:
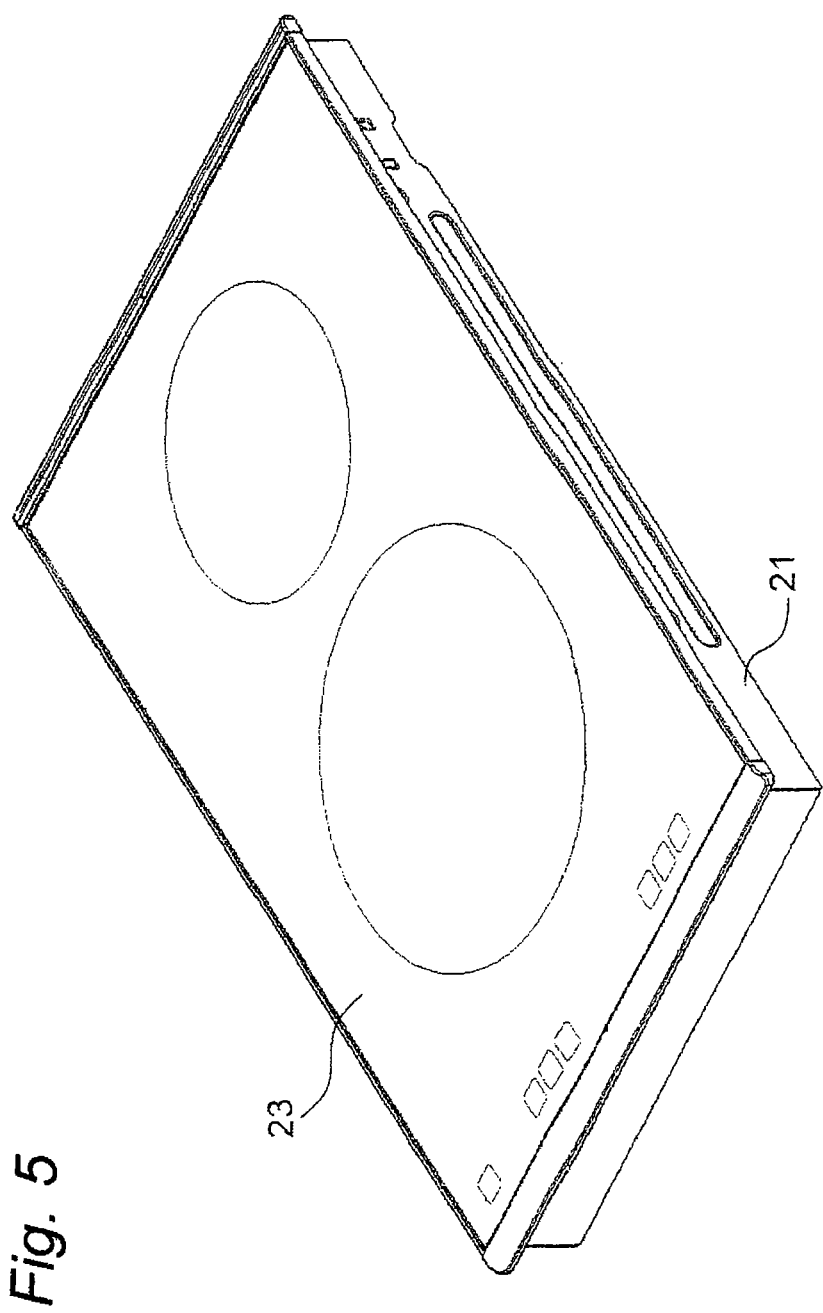
FIG. 5 is a perspective view showing a variation of the induction heating cooker according to the fourth embodiment of the present invention.
Figure 6:
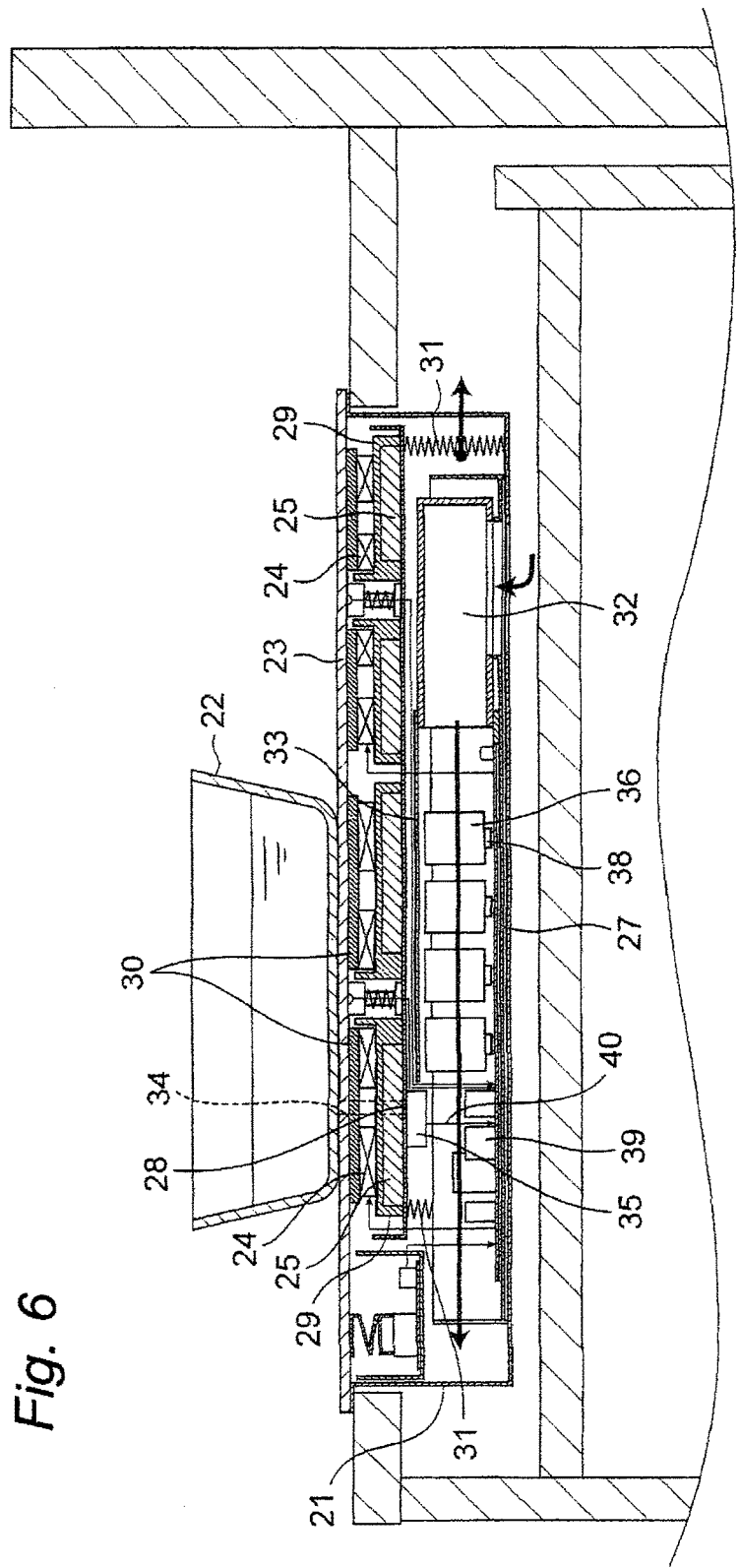
FIG. 6 is a cross-sectional view showing a state where the induction heating cooker shown in FIG. 5 is installed in a cabinet of a kitchen appliance.
Figure 7:
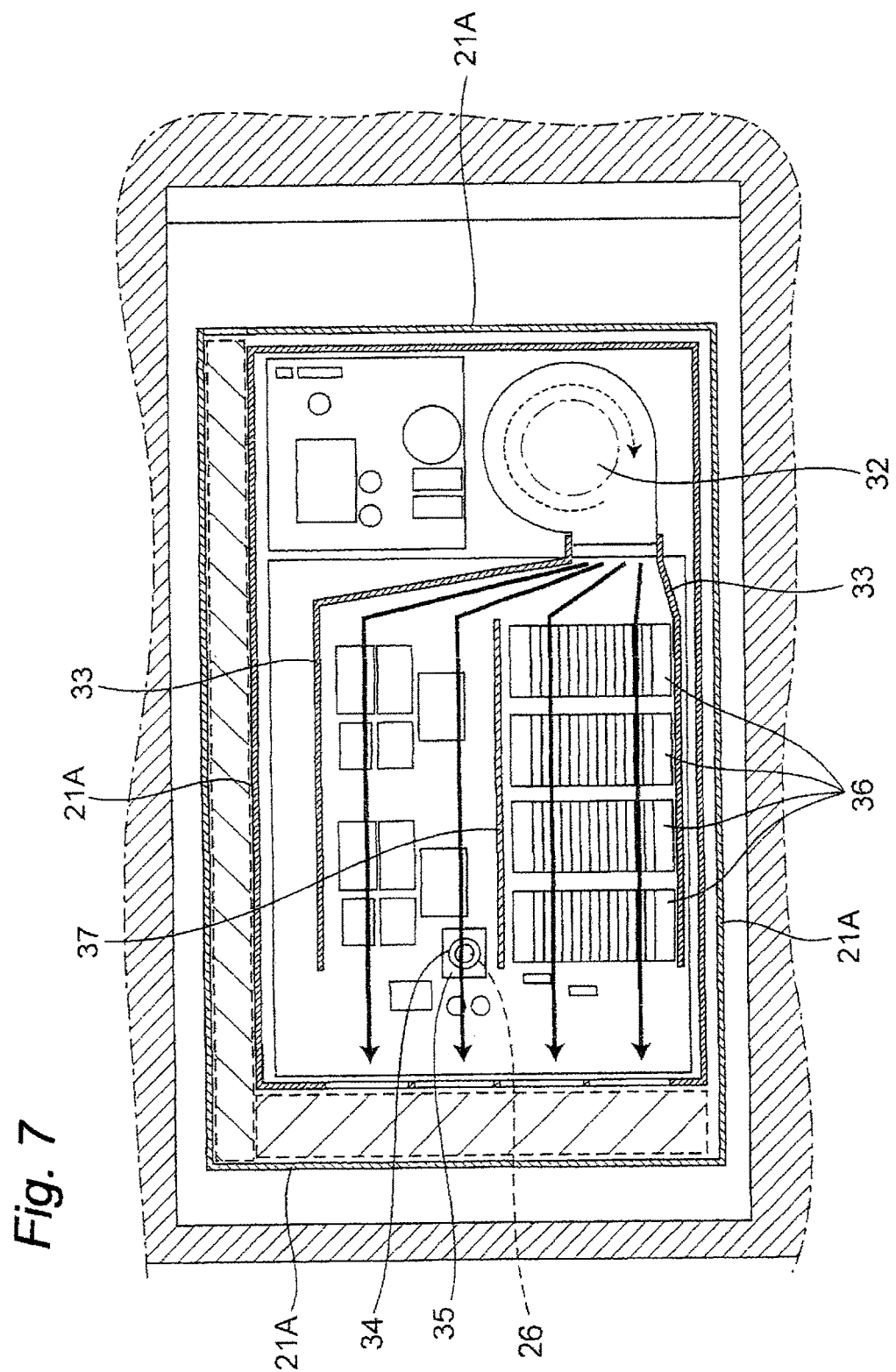
FIG. 7 is a plan view showing the inside of a duct of the induction heating cooker shown in FIG. 5 as seen from above.
Figure 8:
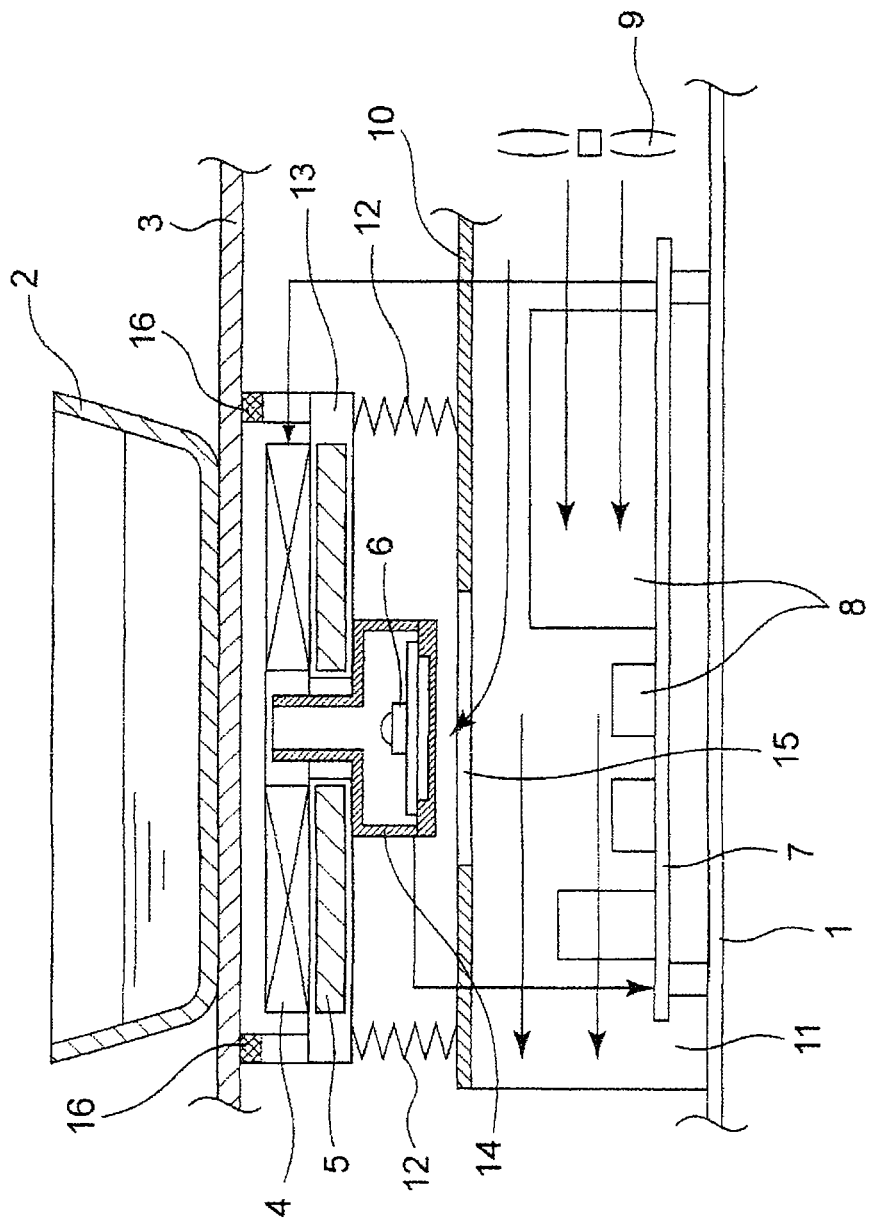
FIG. 8 is a cross-sectional view showing the structure of a conventional induction heating cooker.

FIG. 5 is a perspective view of an induction heating cooker according to Example of the present invention. FIG. 6 is a cross-sectional view of the induction heating cooker shown in FIG. 5. FIG. 7 is a plan view of the inside of a duct of the induction heating cooker shown in FIG. 5 as seen from above. Identical reference characters are allotted to components identical to those according to the embodiments described above.

According to the present Example, as shown in FIG. 6, since the top surface of the casing 35 is fixed to the bottom surface of the heat dissipating plate 28, intervening objects between the infrared sensor 26 and the control circuit 27 can be reduced. Accordingly, an improvement in the assemblability can be achieved, e.g., the layout of the wiring 40 electrically connecting between the infrared sensor 26 and the control circuit 27 is simplified.

Further, according to the present Example, as shown in FIG. 7, since the guide 37 is placed inside the duct 33 such that the cooling air is branched into the first cooling air directed toward the infrared sensor 26 and the second cooling air directed toward the switching elements 38, the cooling air of a greater volume can be blown in the infrared sensor 26. Thus, the performance of cooling the infrared sensor 26 can further be improved.

Still further, according to the present Example, as shown in FIG. 7, since the control circuit 27 and the infrared sensor 26 are disposed on the windward side in connection with the cooling air from the air blower 32 than the circumferential wall 21A of the body 21, the control circuit 27 and the infrared sensor 26 can efficiently be cooled without being affected by the ambient temperature of the induction heating cooker (room temperature) or the temperature inside the kitchen cabinet.

Still further, according to the present Example, as shown in FIG. 7, the infrared sensor 26 and the switching elements 38 for creating a high frequency current at the control circuit 27 are disposed substantially in parallel to each other relative to the flow direction of the cooling air from the air blower 32. Thus, it becomes possible to reduce the effect of the heat generated by the switching elements 38 on the infrared sensor 26, and consequently, the performance of cooling the infrared sensor 26 can be improved.

By properly combining arbitrary embodiments of the aforementioned various embodiments, the effects owned by each of them can be made effectual.

INDUSTRIAL APPLICABILITY

The induction heating cooker according to the present invention provides improved assemblability, and with the induction heating cooker, a reduction in the temperature sensing precision of the infrared sensor can be suppressed and a reduction in the thickness of the induction heating cooker can be achieved. Therefore, it is useful as disaster prevention equipment that has an infrared sensor and that operates based on temperature monitoring, temperature measuring equipment that uses an infrared sensor, cooking equipment that uses an inverter, and the like.

Although the present invention has been fully described in connection with the preferred embodiments thereof with reference to the accompanying drawings, it is noted that various changes and modifications are apparent to those skilled in the art. Such changes and modifications are to be understood as included within the scope of the present invention as defined by the appended claims unless they depart therefrom.

The entire disclosure of Japanese Patent Application No. 2009-067438 filed on Mar. 19, 2009, including specification, claims, drawings, and summary are incorporated herein by reference in its entirety.

The invention claimed is:

1. An induction heating cooker, comprising:
 a body that structures an outer casing;
 a top plate that covers a top portion of the body;
 a heating coil that is placed below the top plate, the heating coil heating a cooking vessel placed on the top plate;
 an infrared sensor disposed inside a casing having a plurality of vent openings, wherein the casing is disposed below the heating coil and the infrared sensor is configured to sense infrared radiation radiated from the cooking vessel;
 a control circuit that is placed lower than the heating coil, the control circuit controlling an output of a high frequency current that energizes the heating coil based on an output of the infrared sensor;
 an air blower that is placed lower than the heating coil, the air blower producing cooling air;
 a duct that-forms a cooling air path that guides the cooling air over the control circuit, through the plurality of vent opening, and over the infrared sensor, wherein the duct is connected to an outlet of the cooling air of the air blower, and the casing and the control circuit are placed at least partially inside the duct; and
 a heat dissipating plate disposed below the heating coil and above the duct to partition a space on a side of the heating coil, and a space on a side of the duct, the infrared sensor, and the control circuit, wherein a bottom surface of the heat dissipating plate abuts a top surface the duct, and wherein at least part of a surface of the heat dissipating plate is exposed to the space inside the body to facilitate dissipating heat transferred from the heating coil or the cooking vessel toward the space inside the body.

2. The induction heating cooker according to claim 1, wherein the control circuit and the infrared sensor are disposed inside the duct.

3. The induction heating cooker according to claim 1, further comprising
below the heating coil, a heat dissipating plate that dissipates heat transferred from the heating coil or the cooking vessel, wherein
the infrared sensor, the control circuit, and the air blower are disposed lower than the heat dissipating plate.

4. The induction heating cooker according to claim 3, wherein the heat dissipating plate is brought into contact with the cooling air on a leeward side in connection with the cooling air than the control circuit and the infrared sensor, and cooled thereby.

5. The induction heating cooker according to claim 3, wherein the heat dissipating plate has a magnetic field shielding effect of preventing a magnetic field generated by the heating coil from leaking below the heat dissipating plate.

6. The induction heating cooker according to claim 1, further comprising
a guide that is attached inside the duct, the guide branching the cooling air into a first cooling air directed toward the infrared sensor and a second cooling air directed toward the control circuit.

7. The induction heating cooker according to claim 1, wherein the infrared sensor is attached to the control circuit.

8. The induction heating cooker according to claim 1, wherein
the infrared sensor is disposed inside a casing, and
the casing has a top surface attached to a bottom surface of a top wall of the duct.

9. The induction heating cooker according to claim 3, wherein
the infrared sensor is disposed inside a casing, and
the casing penetrates through the heat dissipating plate and is attached to a coil base supporting the heating coil.

10. The induction heating cooker according to claim 8, further comprising
a cylindrical element that penetrates through a top portion of the casing so as to extend from a proximity of the infrared sensor to a proximity of a back surface of the top plate.

11. The induction heating cooker according to claim 1, wherein
the control circuit includes a switching element for producing the high frequency current, and
the infrared sensor and the switching element are disposed substantially in parallel to each other in a flow direction of the cooling air.

12. The induction heating cooker according to claim 1, wherein a light-absorbing process is placed to a surface of the duct facing the top plate.

13. An induction heating cooker, comprising:
a body that structures an outer casing;
a top plate that covers a top portion of the body;
a heating coil for heating a cooking vessel placed on the top plate disposed below the top plate;
a ferrite element disposed below the heating coil;
a heat dissipating plate disposed below the ferrite element that dissipates heat transferred from the heating coil or the cooking vessel, the heat dissipating plate having a bottom surface;
a duct with a top surface, which abuts the bottom surface of the heat dissipating plate, disposed below the heat dissipating plate, where a first end of the top surface is arranged adjacent to a blower and a second end of the top surface is arranged in a region of the body opposite the blower;
an infrared sensor configured to sense infrared radiation radiated from the cooking vessel disposed inside a casing, wherein a first portion of the casing is disposed below the top surface of the duct and a second portion of the casing protrudes through the top surface of the duct in a region that is between the first end and the second end of the top surface of the duct;
a control circuit disposed below heat dissipating plate, the control circuit controlling an output of a high frequency current that energizes the heating coil based on an output of the infrared sensor;
wherein the air blower that is placed lower than the heating coil, the air blower producing cooling air;
wherein the duct that forms a cooling air path that guides the cooling air over the control circuit and around the casing, wherein the duct is connected to an outlet of the cooling air of the air blower, and the casing and the control circuit are placed at least partially inside the duct; and
wherein the heat dissipating plate is disposed below the heating coil and above the duct and partitions a space on a side of the heating coil, and a space on a side of the duct, the infrared sensor, and the control circuit to expose at least part of a surface of the heat dissipating plate to the space inside the body, for dissipating heat transferred from the heating coil or the cooking vessel toward the space inside the body.

* * * * *